United States Patent
Sato et al.

(10) Patent No.: US 7,629,427 B2
(45) Date of Patent: Dec. 8, 2009

(54) BLOCK POLYMER COMPOUND, POLYMER COMPOSITION CONTAINING THE SAME, IMAGE FORMING METHOD AND IMAGE FORMING APPARATUS UTILIZING THE SAME

(75) Inventors: Koichi Sato, Kanagawa-ken (JP); Ikuo Nakazawa, Kanagawa-ken (JP); Sakae Suda, Kanagawa-ken (JP); Masayuki Ikegami, Kanagawa-ken (JP); Keiichiro Tsubaki, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 391 days.

(21) Appl. No.: 10/519,914

(22) PCT Filed: Jul. 1, 2003

(86) PCT No.: PCT/JP03/08353

§ 371 (c)(1),
(2), (4) Date: Jan. 3, 2005

(87) PCT Pub. No.: WO2004/005362

PCT Pub. Date: Jan. 15, 2004

(65) Prior Publication Data

US 2005/0219277 A1    Oct. 6, 2005

(30) Foreign Application Priority Data

| Jul. 3, 2002 | (JP) | ................... 2002-195116 |
| Sep. 27, 2002 | (JP) | ................... 2002-283447 |
| Oct. 1, 2002 | (JP) | ................... 2002-289168 |
| May 8, 2003 | (JP) | ................... 2003-130000 |

(51) Int. Cl.
*C08F 20/06* (2006.01)
*C08F 18/00* (2006.01)
*C08F 18/16* (2006.01)
*C08F 20/68* (2006.01)
*C08F 120/18* (2006.01)
*C08F 16/12* (2006.01)
*B41J 2/01* (2006.01)
*C09D 11/00* (2006.01)

(52) U.S. Cl. .................... 526/317.1; 526/318; 526/320; 526/326; 526/329.7; 526/332; 347/1; 523/161

(58) Field of Classification Search .............. 526/317.1, 526/318, 320, 326, 329.7, 332; 347/1; 523/161
See application file for complete search history.

(56) References Cited

U.S. PATENT DOCUMENTS 5,085,698 A    2/1992    Ma et al. ...................... 106/20

(Continued)

FOREIGN PATENT DOCUMENTS

EP    0 465 124    1/1991

(Continued)

OTHER PUBLICATIONS

Sadahito Aoshima et al., "Living Cationic Polymerization of Vinyl Monomers by Organoaluminium Halides," pp. 417-423 (1986).

*Primary Examiner*—William K Cheung
(74) *Attorney, Agent, or Firm*—Fitzpatrick, Cella, Harper & Scinto

(57) ABSTRACT

The invention provides a block polymer compound enabling satisfactory dispersion of a colorant in a solvent, and an ink composition containing such block polymer compound. The block polymer compound of the invention is a block polymer compound having at least three block segments, comprising block segments A, B and C arranged in succession, wherein the block segment C is most solvent attractive while the block segment A is most solvent repulsive, and at least either one of the block segments includes an ionic group or an acidic group.

3 Claims, 1 Drawing Sheet

U.S. PATENT DOCUMENTS

| | | | |
|---|---|---|---|
| 6,306,994 B1 * | 10/2001 | Donald et al. | 526/317.1 |
| 7,067,590 B2 | 6/2006 | Sato et al. | 525/299 |
| 2002/0186288 A1 | 12/2002 | Nakazawa et al. | 347/100 |
| 2003/0027894 A1 | 2/2003 | Sato et al. | 523/160 |
| 2003/0050364 A1 | 3/2003 | Sato et al. | 523/160 |
| 2003/0144377 A1 * | 7/2003 | Sano et al. | 523/160 |
| 2005/0033010 A1 | 2/2005 | Sato et al. | 528/80 |
| 2005/0131102 A1 | 6/2005 | Nakazawa et al. | 523/160 |
| 2005/0140762 A1 | 6/2005 | Sato et al. | 347/100 |
| 2005/0197424 A1 | 9/2005 | Higashi et al. | 523/160 |
| 2005/0209367 A1 | 9/2005 | Sato et al. | 523/161 |
| 2005/0219277 A1 | 10/2005 | Sato et al. | 347/1 |
| 2005/0239918 A1 | 10/2005 | Nakazawa et al. | 523/160 |
| 2005/0249925 A1 | 11/2005 | Ikegami et al. | 428/195.1 |
| 2006/0004124 A1 | 1/2006 | Tsubaki et al. | 523/160 |
| 2006/0047015 A1 | 3/2006 | Duda et al. | 523/160 |
| 2006/0148997 A1 | 7/2006 | Sato et al. | 525/299 |

FOREIGN PATENT DOCUMENTS

| | | |
|---|---|---|
| EP | 1 243 624 | 9/2002 |
| EP | 1 285 948 | 2/2003 |
| JP | 11-80221 | 3/1999 |
| JP | 11-322866 | 11/1999 |
| JP | 11-322942 | 11/1999 |
| JP | 3595805 B2 | 12/2004 |

* cited by examiner

BLOCK POLYMER COMPOUND, POLYMER COMPOSITION CONTAINING THE SAME, IMAGE FORMING METHOD AND IMAGE FORMING APPARATUS UTILIZING THE SAME

TECHNICAL FIELD

The present invention relates to a novel block polymer compound useful as various functional materials, a polymer-containing composition containing the same, and an image forming method and an image forming apparatus utilizing the same.

BACKGROUND ART

In the field of aqueous dispersion including a functional material, there are known functional materials, for example, agricultural chemicals such as a herbicide or an insecticide, pharmaceuticals such as an anticancer agent, an antiallergy agent or an anti-inflammation agent, a coloring material such as an ink or a toner containing a colorant. Recently, digital printing technologies are showing remarkable progresses. Such digital printing technologies, represented by so-called electrophotographic technology and ink jet recording technology, are becoming more and more important as an image forming technology in the offices and at homes.

Among such technologies, the ink jet technology, being a direct recording technology, has significant features of compactness and a low electric power consumption. Also it recently shows a rapid improvement in the image quality due, for example, to a formation of finer nozzles. An example of the ink jet technology is a method of heating an ink, supplied from an ink tank, with a heater in a nozzle, thereby inducing an evaporation and a bubble formation, thus discharging the ink and forming a record on a recording medium. Another example is a method of generating a vibration in a piezoelectric element, thereby discharging the ink.

The ink employed in these methods is generally an aqueous solution of a dye, and hence there may take place a bleeding when plural colors are superposed or so-called feathering phenomenon, along a direction of fibers of paper in a recorded portion of the recording medium. For avoiding these drawbacks, U.S. Pat. No. 5,085,698 discloses a use of an ink composed of a pigment dispersion. However, there are in fact desired various improvements on such existing technologies.

DISCLOSURE OF THE INVENTION

In consideration of the drawbacks in the known background art, the present invention is to provide a block polymer compound which enables satisfactory dispersion of a functional material in a solvent.

Also the present invention is to provide a polymer-containing composition, including the aforementioned block polymer compound and being satisfactory in dispersibility, fixability and environmental affinity.

The present invention is to provide a block polymer compound having at least three block segments, comprising block segments A, B and C arranged in succession, wherein the block segment C is most solvent attractive while the block segment A is most solvent repulsive, and at least either one of the block segments has an ionic group or an acidic group.

The present invention is to provide a block polymer compound having at least three block segments, comprising block segments A, B and C arranged in succession, wherein at least either one of the block segments has at least a functional group selected from the group consisting of a carboxylic acid, a carboxylic acid ester and a carboxylic acid salt, connected to the main chain via two or more atoms.

The present invention is to provide a block polymer compound having at least three block segments, comprising block segments A, B and C arranged in succession, wherein the block segment A is a hydrophobic block segment, the block segment B is a nonionic hydrophilic block segment, and the block segment C has at least one functional group selected from the group consisting of a carboxylic acid, a carboxylic acid ester and a carboxylic acid salt.

The present invention is also to provide a polymer-containing composition comprising a block polymer compound, a solvent or a dispersion medium, and a functional material, wherein the block polymer compound comprises block segments A, B and C arranged in succession, the block segment C is most solvent attractive while the block segment A is most solvent repulsive, and at least either one of the block segments has an ionic group or an acidic group.

The present invention is also to provide a method of increasing the viscosity of a polymer-containing composition which comprises a block polymer compound, a solvent or a dispersion medium, and a functional material, wherein the block polymer compound comprises block segments A, B and C arranged in succession, the block segment C is most solvent attractive while the block segment A is most solvent repulsive, and at least either one of the block segments has an ionic group or an acidic group, the method comprising a step of bringing the composition into contact with hydrogen ions or metal cations thereby increasing the viscosity of the composition.

The present invention is also to provide an image forming method comprising the step of applying an ink onto a recording medium to conduct recording, wherein the ink is a polymer-containing composition comprising a block polymer compound, a solvent or a dispersion medium, and a functional material, wherein the block polymer compound comprises block segments A, B and C arranged in succession, the block segment C is most solvent attractive while the block segment A is most solvent repulsive, and at least either one of the block segments has an ionic group or an acidic group.

The present invention is also to provide an image forming apparatus for conducting recording by applying an ink onto a recording medium, wherein the ink is a polymer-containing composition comprising a block polymer compound, a solvent or a dispersion medium, and a functional material, wherein the block polymer compound comprises block segments A, B and C arranged in succession, the block segment C is most solvent attractive while the block segment A is most solvent repulsive, and at least either one of the block segments has an ionic group or an acidic group.

According to the present invention, there can be provided a block polymer compound capable of satisfactorily dispersing a functional material into a solvent.

Also according to the present invention, such block polymer compound can be utilized to provide a polymer-containing composition and an ink composition satisfactory in dispersibility, fixability, and environmental affinity.

Also according to the present invention, such composition can be utilized to provide an image forming method and an image forming apparatus satisfactory in dispersibility, fixability and environmental affinity.

BEST MODE FOR CARRYING OUT THE INVENTION

Figure 1:
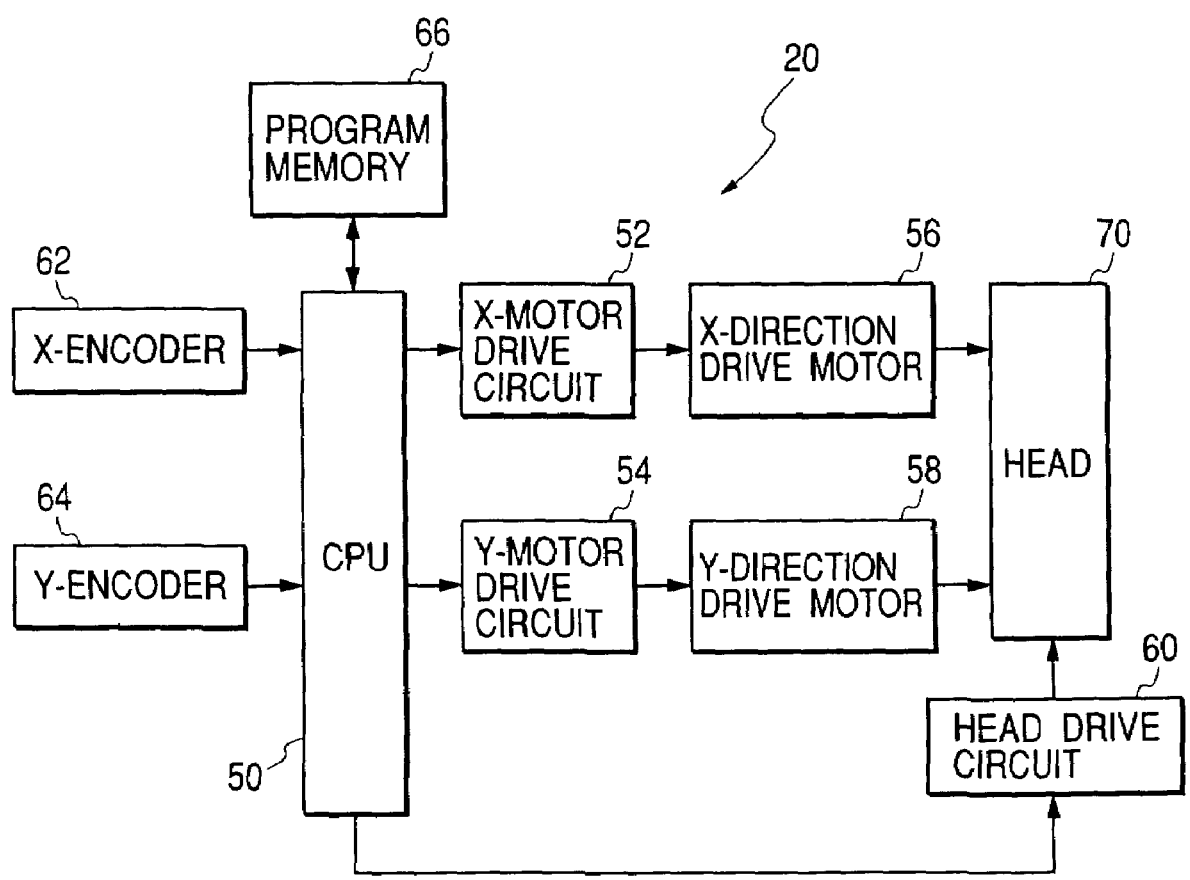
FIG. 1 is a block diagram showing an example of a configuration of an ink jet recording apparatus.

The present inventors have made the present invention as a result of intensive investigations.

In the present invention, a first invention is a block polymer compound having at least three block segments, comprising block segments A, B and C arranged in succession, wherein the block segment C is most solvent attractive while the block segment A is most solvent repulsive, and at least either one of the block segments has an ionic group or an acidic group.

More specifically, in the present invention, the block segments A, B and C arranged in succession are solvent attractive in the order of A<B<C, and A or C is substantially ionic. As an ionic functional group, there is preferred a carboxylic acid or a carboxylic acid salt, and there can be employed an ordinarily employed organic acid or a salt thereof, an ordinarily employed organic base or a salt thereof. The block segments, having such successively varying property and showing an ionic character, allow to exhibit a more uniform micelle structure.

In the block polymer compound, it is preferred that C is most hydrophilic and A is most hydrophobic.

In the present invention, a second invention is a block polymer compound having at least three block segments, comprising block segments A, B and C arranged in succession, wherein at least either one of the block segments has at least a functional group selected from the group consisting of a carboxylic acid, a carboxylic acid ester and a carboxylic acid salt, connected to a main chain via two or more atoms.

In the foregoing, "at least one selected from the group consisting of a carboxyl acid, a carboxylic acid ester and a carboxylic acid salt, connected to a main chain via two or more atoms" means that a carboxyl acid, a carboxylic acid ester or a carboxylic acid salt is not present in a form directly connected to the main chain but connected through a certain connecting group that has two or more atoms. More specifically, the carboxylic acid, the carboxylic acid ester or the carboxylic acid salt is not present in such a form that the mobility thereof is restricted by the main chain as in a polymer of acrylic acid, methacrylic acid, itaconic acid or a derivative thereof, but in such a form that the carboxylic acid, carboxylic acid ester or carboxylic acid salt is capable of a certain free molecular movement via a connecting group such as an alkylene group or an alkyleneoxy group. Consequently the connecting group has two or more atoms, preferably three or more atoms, more preferably four or more atoms and further preferably five or more atoms.

This is because a connected structure too close to the main chain may restrict mobility of carboxylic acid, carboxylic acid ester or carboxylic acid salt thereby possibly hindering an intermolecular or intramolecular interaction. Therefore, a structure of a free carboxylic acid or of a carboxylic acid salt is preferred for fully attaining such interaction. However, such free carboxylic acid or carboxylic acid salt is often obtained by hydrolyzing a carboxylic acid ester. Therefore, a carboxylic acid ester structure is very useful as a synthesis precursor for a free carboxylic acid structure or a carboxylic acid salt structure, though it may not be able to exert much intermolecular or intramolecular interaction.

In the present invention, a third invention is a block polymer compound having at least three block segments, comprising block segments A, B and C arranged in succession, wherein the block segment A is a hydrophobic block segment, the block segment B is a nonionic hydrophilic block segment, and the block segment C has at least one functional group selected from the group consisting of a carboxylic acid, a carboxylic acid ester and a carboxylic acid salt. The block segments of such sequence and structures have successively varying properties and an ionic character, thereby enabling to exhibit a more uniform micelle structure. Free carboxylic acid or carboxylic acid salt is often obtained by hydrolyzing a carboxylic acid ester. Therefore, a carboxylic acid ester structure is very useful as a synthesis precursor for a free carboxylic acid structure or a carboxylic acid salt structure, though it may not be able to exert much intermolecular or intramolecular interaction.

The block polymer compound of the present invention is a block polymer compound have three or more block segments. Examples of the block structure are as follows. The present invention includes a triblock polymer having mutually different block segments ABC, and a structure in which another polymer unit is bonded to such triblock structure. For example, the present invention includes a structure having four different block segments ABCD, a structure of ABCA, and a block polymer having an even larger number of block segments. The block polymer of the present invention is characterized by including at least three block segments.

The block polymer used in the present invention is also called a block copolymer.

In a preferred embodiment, the block polymer compound of the present invention is an amphiphilic polymer compound. Such amphiphilic character is exhibited by that, in the block polymer compound of the present invention, at least a block segment is solvent attractive while at least another block segment is solvent repulsive. Such solvent attractive character and solvent repulsive character are preferably exhibited with respect to an aqueous solvent. Stated differently, the block polymer of the present invention preferably includes at least a hydrophobic segment and at least a hydrophilic segment.

A preferred specific example of the block polymer compound of the present invention is a compound including a polyvinyl ether structure as a repeating unit structure. Also there is preferred a compound including a repeating unit structure which has a carboxylic acid, a carboxylic acid ester or a carboxylic acid salt in a side chain and is represented by the following general formula (1):

(1)

wherein $R^0$ represents —X—$(COOH)_r$, —X—$(COOR^{10})_r$, or —X—$(COO-M)_r$; X represents a linear, branched or cyclic alkylene group with 1 to 20 carbon atoms, —$(CH(R^5)$—$CH(R^6)$—$O)_p$—$(CH_2)_m$—$CH_{3-r}$—, —$(CH_2)_m$—$(O)_n$—$(CH_2)_q$—$CH_{3-r}$— or a structure in which at least one of methylene groups therein is replaced by a carbonyl group or an aromatic ring structure; r represents 1 or 2; p represents an integer from 1 to 18; m represents an integer from 0 to 35, n represents 1 or 0; q represents an integer from 0 to 17; $R^{10}$ represents an alkyl group; M represents a monovalent or polyvalent cation; and $R^5$ and $R^6$, which may be the same or different, each independently represent an alkyl group.

In the following, there will be shown specific examples of the repeating unit structure represented by the general formula (1):

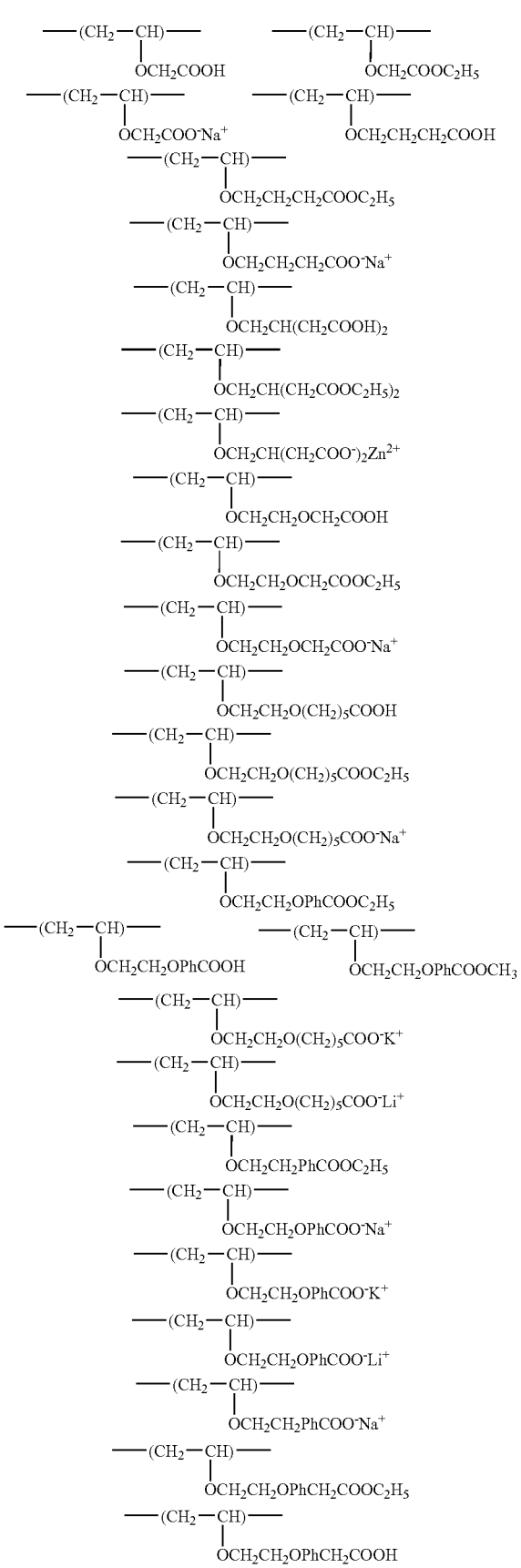

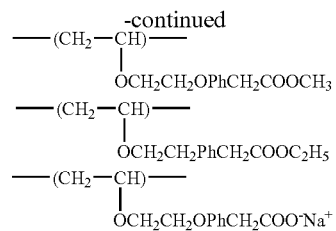

In the foregoing, Ph represents a phenylene group.

A preferred specific example of the compound having a polyvinyl ether structure is a compound including a repeating unit represented by the following general formula (2):

$$-(-CH_2-CH-)-\atop|\atop OR^1 \qquad (2)$$

In the foregoing general formula, $R^1$ is a group selected from the group consisting of a linear, branched or cyclic alkyl group with 1 to 18 carbon atoms, -Ph, -Pyr, -Ph-Ph, -Ph-Pyr, $-(CH(R^5)-CH(R^6)-O)_p-R^7$ and $-(CH_2)_m-(O)_n-R^7$, in which a hydrogen atom in an aromatic ring may be replaced by a linear or branched alkyl group with 1 to 4 carbon atoms and a carbon atom in an aromatic ring may be replaced by a nitrogen atom;

p represents an integer from 1 to 18; m represents an integer from 1 to 36; n represents 0 or 1;

$R^5$ and $R^6$ each independently represent a hydrogen atom or $-CH_3$;

$R^7$ represents a hydrogen atom, a linear, branched or cyclic alkyl group with 1 to 18 carbon atoms, -Ph, -Pyr, -Ph-Ph, -Ph-Pyr, $-CHO$, $-CH_2CHO$, $-CO-CH=CH_2$, $-CO-C(CH_3)=CH_2$, or $-CH_2COOR^8$, in which, in case $R^7$ is other than a hydrogen atom, a hydrogen atom bonded to a carbon atom in $R^7$ may be replaced by a linear or branched alkyl group with 1 to 4 carbon atoms, $-F$, $-Cl$ or $-Br$ while a carbon atom in an aromatic ring may be replaced by a nitrogen atom; $R^8$ represents a hydrogen atom or an alkyl group with 1 to 5 carbon atoms; Ph represents a phenyl group; and Pyr represents a pyridyl group.

Specific examples of the repeating unit structure represented by the general formula (2) include the following:

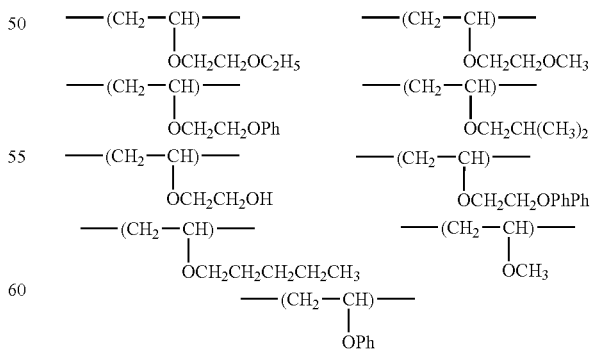

wherein Ph represents a phenylene group.

The block polymer compound of the present invention is preferably a block polymer having three or more block segments including a hydrophobic block segment and a hydrophilic block segment and also including at least one stimulus-responsive block segment. A specific example is an ABC triblock polymer, including a hydrophobic block segment A represented by:

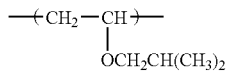

as an example of the aforementioned hydrophobic repeating unit, also a segment B represented by:

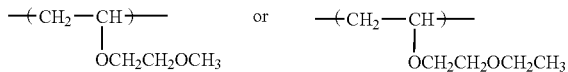

as an example of the aforementioned stimulus-responsive repeating unit, and a segment C represented by:

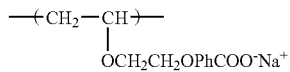

as an example of the aforementioned repeating unit.

In the block polymer compound of the present invention, each block segment may be constituted of a single repeating unit or of a structure of plural repeating units. Examples of the block segment constituted of plural repeating units include a random copolymer and a graduation copolymer in which a composition ratio shows a gradual change.

Also the block polymer compound of the present invention is a block polymer having three or more block segments, and can also be a polymer in which such block polymer is grafted to another polymer.

In the present invention, the content of the repeating unit structure represented by the general formula (1) in the block polymer compound is within a range from 0.01 to 99 mol. % with respect to the entire block polymer compound, preferably 1 to 90 mol. %. A content less than 0.01 mol. % may result in an insufficient polymer interaction to be exerted by carboxylic acid, carboxylic acid ester or carboxylic acid salt, while a content exceeding 99 mol. % may result in an excessive interaction, thus leading to an insufficient function.

The block polymer compound of the present invention has a number-average molecular weight (Mn) within a range from 200 to 10,000,000, preferably 1,000 to 1,000,000. A molecular weight exceeding 10,000,000 may result in an excessive entanglement within a polymer chain or between polymer chains, thus leading to a difficulty in dispersion in the solvent. On the other hand, a molecular weight less than 200 may result in a difficulty in exhibiting a steric effect as a polymer, because of an excessively low molecular weight. In each block segment, a preferred degree of polymerization is from 3 to 10,000, more preferably 5 to 5,000 and further preferably 10 to 4,000.

For improving a dispersion stability and an inclusivity, the block polymer preferably has a more flexible molecular mobility. This is because a more flexible molecular mobility of the block polymer enhances a physical entanglement of the block polymer with the surface of a functional material, thereby increasing affinity. Also such flexible character is preferred also in forming a coating layer on a recording medium as will be explained later. For this end, the main chain of the block polymer preferably has a glass transition temperature Tg of 20° C. or less, more preferably 0° C. or less and further preferably −20° C. or less. Also in this regard, a polymer having a polyvinyl ether structure can be employed advantageously since it generally has a low glass transition point and is flexible. Most of the aforementioned repeating unit structures have a glass transition temperature of about −20° C. or lower.

The block polymer compound having the polyvinyl ether repeating unit structure and advantageously employed in the present invention is often polymerized by a cationic polymerization. As an initiator, there can be employed a combination of a protonic acid such as hydrochloric acid, sulfuric acid, methanesulfonic acid, trifluoroacetic acid, trifluoromethanesulfonic acid or perchloric acid, or a Lewis acid such as $BF_3$, $AlCl_3$, $TiCl_4$, $SnCl_4$, $FeCl_3$, $RAlCl_2$ or $R_{1.5}AlCl_{1.5}$ (R representing an alkyl group) and a cation source (which can be a protonic acid, water, an alcohol or an addition product of vinyl ether and a carboxylic acid). Such initiator is made to be present with a polymerizable compound (monomer) whereby a polymerization reaction proceeds and the block polymer compound can be synthesized. In the block polymer compound including the polyvinyl ether repeating unit structure and preferably employed in the present invention, the polyvinyl ether repeating unit structure is more preferably contained in a content of 90 mol. % or higher.

In the following there will be explained a polymerization method more preferably employed in the present invention. Various methods have been reported for synthesizing a polymer including a polyvinyl ether structure (cf. Japanese Patent Application Laid-open No. 11-080221), among which representative ones are a method by a cation living polymerization by Aoshima et al. (Polymer Bulletin, vol. 15, 1986, p. 417; Japanese Patent Application Laid-open Nos. 11-322942 and 11-322866). A polymer synthesis by cation living polymerization allows to obtain various polymers such as a homopolymer, a copolymer composed of two or more monomer components, a block polymer, a graft polymer or a graduation polymer, with an exactly aligned length (molecular weight). The living polymerization can also be executed in an $HI/I_2$ system or in an $HCl/SnCl_4$ system.

The block polymer compound of the present invention, comprising block segments including a repeating unit structure having a carboxylic acid, a carboxylic acid ester or a carboxylic acid salt which is not directly connected to a main chain of the polymer but is connected via a connecting group with two or more atoms, can exhibit an interaction suitable for forming a high-order structure or a highly stable dispersion. Also, including three segments of successively varying solvent attractive property and having three or more block segments can exhibit three or more functions. Therefore, in comparison with a polymer compound including two or less block segments, it can also form a precise structured member of a higher order. It is also possible, by providing the plural block segments with similar properties, to stabilize the properties of the polymer.

In the following there will be explained a fourth invention of the present invention.

In the present invention, a fourth invention is a polymer-containing composition which comprises a solvent or a dispersion medium, a functional material and the aforementioned block polymer compound of the present invention. The composition may include the aforementioned block polymer compound and a functional material for exerting a predetermined useful function such as a colorant, and such block polymer compound can be advantageously utilized for satisfactorily dispersing the functional material or the like. The functional material is preferably a liquid or a solid, and may be a soluble substance. For example there can be employed an oil, a pigment, a metal, a herbicide, an insecticide, a material derived from a living organism, a pharmaceutical, a dye or a molecular catalyst.

In the polymer-containing composition of the present invention, the block polymer compound of the present invention is contained in an amount of 0.1 to 99 mass % with respect to the weight of the composition, preferably 0.3 to 70 mass %. A content less than 0.1 mass % may result in an insufficient dispersibility for the functional material, while a content exceeding 99 mass % may result in an excessively high viscosity. Also in the composition of the present invention, the functional material is contained in an amount of 0.1 to 80 mass %, preferably 0.5 to 60 mass %. A content less than 0.1 mass % may result in an insufficient functionality while a content exceeding 80 mass % may cause an insufficient dispersion.

Further, the polymer-containing composition of the present invention includes a solvent or a dispersion medium, and a binder resin may be employed as the dispersion medium. For the solvent or the dispersion medium, there can be employed water, an aqueous solvent or a non-aqueous organic solvent, or they may be employed as a mixture.

Examples of the aqueous solvent include a polyhydric alcohol such as ethylene glycol, diethylene glycol, triethylene glycol, polyethylene glycol, propylene glycol, popypropylene glycol, or glycerin; a polyhydric alcohol ether such as ethylene glycol monomethyl ether, ethylene glycol monoethyl ether, ethylene glycol monobutyl ether, diethylene glycol monoethyl ether or diethylene glycol monobutyl ether; and a nitrogen-containing solvent such as N-methyl-2-pyrrolidone, a substituted pyrrolidone, or triethanol amine. There can also be employed a monohydric alcohol such as methanol, ethanol, or isopropyl alcohol.

Examples of a non-aqueous organic solvent include a hydrocarbon solvent such as hexane, heptane, octane, decane or toluene; cyclohexanone, acetone, methyl ethyl ketone and butyl acetate. There can also be employed a natural oil or fat such as olive oil, soy bean oil, beef tallow or lard.

Examples of the binder resin include a styrene-acryl copolymer and polyester.

In the polymer-containing composition of the present invention, the solvent or the dispersion medium is contained in an amount of 1 to 99 mass %, preferably 10 to 95 mass %. A content less than 1 mass % or exceeding 99 mass % may result in an insufficient dispersion of the functional material.

The polymer-containing composition of the present invention may contain, in addition to the aforementioned components, other components such as an ultraviolet absorber, an antioxidant, a stabilizer etc.

In the polymer-containing composition of the present invention, there is employed a block polymer compound according to the first invention of the present invention, a block polymer compound according to the second invention of the present invention, or a block polymer compound according to the third invention of the present invention. For this reason, it is possible to form an elaborate structure of a higher order.

It is also possible to provide the plural block segments with similar properties, thereby further stabilizing such property. For example, in case of preparing a dispersion by employing the aforementioned ABC-type triblock polymer, a colorant and water as the solvent, it is possible to include the colorant in a micelle formed by the ABC triblock polymer, thereby obtaining an ink composition of a colorant inclusion type. It is furthermore possible to obtain a very uniform particle size in such dispersion, and to obtain an extremely stable dispersion state.

Inclusion of the colorant in the micelle formed by the ABC block polymer means that the colorant is included in a core portion of the formed micelle and is dispersed in this state in a solution.

The inclusion state can be realized by mixing a solution or a dispersion of a colorant in a water-immiscible organic solvent utilizing a mixer or the like for inclusion into the micelles formed by the block polymer in water, and then distilling off the organic solvent.

It can also be realized by executing a phase transfer of a solution of both the polymer and the colorant in an organic solvent into an aqueous solvent thereby forming an included state, and then distilling off the organic solvent. It can further be realized by executing a phase transfer of a mixture containing the dissolved polymer and the dispersed colorant in an organic solvent into an aqueous solvent thereby forming an included state.

The inclusion state can be confirmed by various analytical methods such as with an electron microscope or with X-ray diffraction. Also an inclusion state in micelles can be indirectly confirmed by a separation of the colorant and the polymer from the solvent under a micelle destructing condition.

In the present invention, the functional material is preferably in an inclusion state by 90% or higher.

In the following there will be explained an ink composition, which is a preferred embodiment of the composition of the present invention.

In the ink composition of the present invention, the block polymer compound of the present invention is contained within a range from 0.1 to 90 mass %, preferably 0.3 to 80 mass %. For use in an ink jet printer, the content is preferably within a range from 0.3 to 30 mass %.

In the following, there will be given a detailed explanation on components, other than the block polymer compound, to be included in the ink composition of the present invention. Such other components include water, an aqueous solvent, a colorant, an additive etc. Examples of these components are the same as the examples explained in the foregoing.

A colorant can representatively be a pigment or a dye. The pigment can be an organic pigment or an inorganic pigment, and, for use in the ink, there can be advantageously employed a black pigment and pigments of three primary colors of cyan, magenta and yellow. It is also possible to employ pigments of other colors than those explained in the foregoing, a colorless or pale-colored pigment or a metallic luster pigment. In the present invention, the pigment to be employed may be commercially available or newly synthesized. It is also possible to employ a pigment in combination with a dye.

In the following, there will be shown examples of commercially available pigments of black, cyan, magenta and yellow colors.

Examples of the black pigment include Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRAII, Raven 1190 ULTRAII (foregoing manufactured by Columbian Carbon Inc.), Black Pearls L, MOGUL-L, Regal 1400R, Regal 1660R, Regal 1330R, Monarch 800, Monarch 880, Monarch 900, Monarch 1000, Monarch 1300, Monarch 1400 (foregoing manufactured by Cabot Corp.), Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, Printex 140V (foregoing manufactured by Degussa Corp.), No. 25, No. 33, No. 40, No. 47, No. 52, No. 900, No. 2300, MCF-88, MA600, MA7, MA8, and MA10 (foregoing manufactured by Mitsubishi Chemicals Ltd.), but such examples are not restrictive.

Examples of the cyan color pigment include C.I. Pigment Blue-1, C.I. Pigment Blue-2, C.I. Pigment Blue-3, C.I. Pigment Blue-15, C.I. Pigment Blue-15:2, C.I. Pigment Blue-15:3, C.I. Pigment Blue-15:4, C.I. Pigment Blue-16, C.I. Pigment Blue-22 and C.I. Pigment Blue-60, but these examples are not restrictive.

Examples of the magenta color pigment include C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184, C.I. Pigment Red-202, and C.I. Pigment Red-207, but these examples are not restrictive.

Examples of the yellow color pigment include C.I. Pigment Yellow-12, C.I. Pigment Yellow-13, C.I. Pigment Yellow-14, C.I. Pigment Yellow-16, C.I. Pigment Yellow-17, C.I. Pigment Yellow-74, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151, and C.I. Pigment Yellow-154, but these examples are not restrictive.

In the ink composition of the present invention, there can also be employed a pigment which is self dispersible in water. Such water-dispersible pigment includes one formed by adsorbing a polymer on the surface of a pigment and utilizing a steric hindrance effect and one utilizing an electrostatic repulsive force, and commercially available examples include CAB-0-JET200, CAB-0-JET300 (foregoing manufactured by Cabot Corp.) and Microjet Black CW-1 (manufactured by Orient Chemicals Co.).

In the ink composition of the present invention, the pigment is preferably contained within a range of 0.1 to 50 mass % with respect to the entire weight of the ink composition. A pigment content less than 0.1 mass % cannot provide a sufficient image density, while a pigment content exceeding 50 mass % results in a coagulation of the pigment, thus becoming impossible to disperse. A more preferred range is from 0.5 to 30 mass %.

A dye can also be employed in the ink composition of the present invention. As shown in the following, there can be employed a direct dye, an acidic dye, a basic dye, a reactive dye, a water-soluble food dye or an insoluble dispersion dye.

Examples of the water-soluble dye include:

a direct dye such as C.I. Direct Black-17, -19, -22, -32, -38, -51, -62, -71, -108, -146, -154; C.I. Direct Yellow-12, -24, -26, -44, -86, -87, -98, -100, -130, -142; C.I. Direct Red-1, -4, -13, -17, -23, -28, -31, -62, -79, -81, -83, -89, -227, -240, -242, -243; C.I. Direct Blue-6, -22, -25, -71, -78, -86, -90, -106, -199; C.I. Direct Orange-34, -39, -44, -46, -60; C.I. Direct Violet-47, -48; C.I. Direct Brown-109; and C.I. Direct Green-59;

an acidic dye such as C.I. Acid Black-2, -7, -24, -26, -31, -52, -63, -112, -118, -168, -172, -208; C.I. Acid Yellow-11, -17, -23, -25, -29, -42, -49, -61, -71; C.I. Acid Red-1, -6, -8, -32, -37, -51, -52, -80, -85, -87, -92, -94, -115, -180, -254, -256, -289, -315, -317; C.I. Acid Blue-9, -22, -40, -59, -93, -102, -104, -113, -117, -120, -167, -229, -234, -254; C.I. Acid Orange-7, -19; and C.I. Acid Violet-49;

a reactive dye such as C.I. Reactive Black-1, -5, -8, -13, -14, -23, -31, -34, -39; C.I. Reactive Yellow-2, -3, -13, -15, -17, -18, -23, -24, -37, -42, -57, -58, -64, -75, -76, -77, -79, -81, -84, -85, -87, -88, -91, -92, -93, -95, -102, -111, -115, -116, -130, -131, -132, -133, -135, -137, -139, -140, -142, -143, -144, -145, -146, -147, -148, -151, -162, -163; C.I. Reactive Red-3, -13, -16, -21, -22, -23, -24, -29, -31, -33, -35, -45, -49, -55, -63, -85, -106, -109, -111, -112, -113, -114, -118, -126, -128, -130, -131, -141, -151, -170, -171, -174, -176, -177, -183, -184, -186, -187, -188, -190, -193, -194, -195, -196, -200, -201, -202, -204, -206, -218, -221; C.I. Reactive Blue-2, -3, -5, -8, -10, -13, -14, -15, -18, -19, -21, -25, -27, -28, -38, -39, -40, -41, -49, -52, -63, -71, -72, -74, -75, -77, -78, -79, -89, -100, -101, -104, -105, -119, -122, -147, -158, -160, -162, -166, -169, -170, -171, -172, -173, -174, -176, -179, -184, -190, -191, -194, -195, -198, -204, -211, -216, -217; C.I. Reactive Orange-5, -7, -11, -12, -13, -15, -16, -35, -45, -46, -56, -62, -70, -72, -74, -82, -84, -87, -91, -92, -93, -95, -97, -99; C.I. Reactive Violet-1, -4, -5, -6, -22, -24, -33, -36, -38; C.I. Reactive Green-5, -8, -12, -15, -19, -23; C.I. Reactive Brown-2, -7, -8, -9, -11, -16, -17, -18, -21, -24, -26, -31, -32 and -33;

C.I. Basic Black-2; C.I. Basic Red-1, -2, -9, -12, -13, -14, -27; C.I. Basic Blue-1, -3, -5, -7, -9, -24, -25, -26, -28, -29; C.I. Basic Violet-7, -14, 27; C.I. Food Black-1 and -2.

In the following, there will be shown examples of commercially available oil-soluble dyes of different colors.

Examples of a black oil-soluble dye include C.I. Solvent Black-3, -5, -6, -7, -8, -13, -22, -22:1, -23, -26, -27, -28, -29, -33, -34, -35, -39, -40, -41, -42, -43, -45, -46, -47, -48, -49, and -50, but these examples are not restrictive.

Examples of a yellow oil-soluble dye include C.I. Solvent Yellow-1, -2, -3, -4, -6, -7, -8, -10, -12, -13, -14, -16, -18, -19, -21, -25, -25:1, -28, -29, -30, -32, -33, -34, -36, -37, -38, -40, -42, -43, -44, -47, -48, -55, -56, -58, -60, -62, -64, -65, -72, -73, -77, -79, -81, -82, -83, -83:1, -85, -88, -89, -93, -94, -96, -98, -103, -104, -105, -107, -109, -112, -114, -116, -117, -122, -123, -124, -128, -129, -130, -131, -133, -134, -135, -138, -139, -140, -141, -143, -146, -147, -148, -149, -150, -151-, -152, -153, -157, -158, -159, -160:1, -161, -162, -163, -164, -165, -167, -168, -169, -170, -171, and -172, but these examples are not restrictive.

Examples of an orange oil-soluble dye include C.I. Solvent Orange-1, -2, -3, -4, -4:1, -5, -6, -7, -11, -16, -17, -19, -20, -23, -25, -31, -32, -37, -37:1, -38, -40, -40:1, -41, -45, -54, -56, -59, -60, -62, -63, -67, -68, -71, -72, -73, -74, -75, -76, -77, -79, -80, -81, -84, -85, -86, -91, -94, -95, -98, and 99, but these examples are not restrictive.

Examples of a red oil-soluble dye include C.I. Solvent Red-1, -2, -3, -4, -7, -8, -13, -14, -17, -18, -19, -23, -24, -25, -26, -27, -29, -30, -33, -35, -37, -39, -41, -42, -43, -45, -46, -47, -48, -49, -49:1, -52, -68, -69, -72, -73, -74, -80, -81, -82, -83, -83:1, -84, -84:1, -89, -90, -90:1, -91, -92, -106, -109, -111, -117, -118, -119, -122, -124, -125, -127, -130, -132, -135, -138, -140, -143, -145, -146, -149, -150, -151, -152, -155, -160, -164, -165, -166, -168, -169, -172, -175, -176, -177, -179, -180, -181, -182, -185, -188, -189, -195, -198, -202, -203, -204, -205, -206, -207, -208, -209, -210, -212, -213, -214, -215, -216, -217, -218, -219, -220, -221, -222, -223, -224, -225, -226, -227, -228 and -229, but these examples are not restrictive.

Examples of a violet oil-soluble dye include C.I. Solvent Violet-2, -3, -8, -9, -10, -11, -13, -14, -21, -21:1, -24, -31, -32, -33, -34, -36, -37, -38, -45, -46, and -47, but these examples are not restrictive.

Examples of a blue oil-soluble dye include C.I. Solvent Blue-2, -4, -5, -7, -10, -11, -12, -14, -22, -25, -26, -35, -36, -37, -38, -43, -44, -45, -48, -49, -50, -51, -59, -63, -64, -66, -67, -68, -70, -72, -79, -81, -83, -91, -94, -95, -97, -98, -99, -100, -102, -104, -105, -111, -112, -116, -117, -118, -122, -127, -128, -129, -130, -131, -132, -133, and -134, but these examples are not restrictive.

Examples of a green oil-soluble dye include C.I. Solvent Green-1, -3, -4, -5, -7, -8, -9, -20, -26, -28, -29, -30, -32 and -33, but these examples are not restrictive.

Examples of a brown oil-soluble dye include C.I. Solvent Brown-1, -1:1, -2, -3, -4, -5, -6, -12, -19, -20, -22, -25, -28, -29, -31, -37, -38, -42, -43, -44, -48, -49, -52, -53 and -58, but these examples are not restrictive.

In the ink composition of the present invention, the dye is preferably employed in an amount of 0.1 to 50 mass % with respect to the entire weight of the ink. The aforementioned examples of the colorants are preferred to the ink composition of the present invention, but the colorant to be employed in the ink composition of the present invention is not limited to those shown in the foregoing.

For the solvent, there can be employed water, an aqueous solvent or an organic solvent, but water is preferably employed. As the water, there is preferred ion-exchanged water, purified water or ultra purified water in which metal ions etc. are eliminated.

In the ink composition of the present invention, water is contained preferably within a range from 1 to 95 mass %, more preferably within a range from 5 mass % to less than 95 mass %. Within such range from 1 to 95 mass %, the effect of dispersion is more enhanced and the functional material can be dispersed in a more uniform state.

Examples of the aqueous solvent include a polyhydric alcohol such as ethylene glycol, diethylene glycol, triethylene glycol, polyethylene glycol, propylene glycol, polypropylene glycol, or glycerin; a polyhydric alcohol ether such as ethylene glycol monomethyl ether, ethylene glycol monoethyl ether, ethylene glycol monobutyl ether, diethylene glycol monoethyl ether or diethylene glycol monobutyl ether; and a nitrogen-containing solvent such as N-methyl-2-pyrrolidone, a substituted pyrrolidone, or triethanol amine. Also for expediting drying on paper (recording medium) in the use of the ink, there can be employed a monohydric alcohol such as methanol, ethanol or isopropyl alcohol.

In the ink composition of the present invention, the aqueous solvent is preferably contained in an amount of 0.1 to 50 mass %, more preferably 0.5 to 40 mass %. Within such range from 0.1 to 50 mass %, the wetting effect is more enhanced and the functional material can be dispersed in a more uniform state.

In the ink composition of the present invention, the aforementioned block polymer compound is contained within a range of 0.1 to 90 mass % with respect to the entire weight, preferably 0.3 to 80 mass %. A content of the block polymer less than 0.1 mass % may make it impossible to sufficiently disperse the pigment contained in the ink composition of the present invention, while a content exceeding 90 mass % may cause an excessively high viscosity.

In the present invention, a fifth invention is a method of increasing the viscosity of the composition of the aforementioned fourth invention by bringing it in contact with hydrogen ions or metal cations. More specifically, the present invention provides a method of increasing the viscosity of a composition which includes the block polymer compound of the present invention and the functional material which are typically formed into micelles in an aqueous solution by bringing such composition into contact with hydrogen ions or polyvalent metal ions (for example, cations of zinc, aluminum, calcium, barium, nickel etc.) thereby causing a coagulation of the micelle particles. Since the employed polymer is for example a carboxylic acid salt and in an ionized state, such ionic functional group is neutralized by contact with a sufficient amount of hydrogen ions or metal cations, whereby the affinity between the micelles increases rapidly and the viscosity significantly increases at the same time. Such method can be advantageously applied to an ink composition.

The contact with the composition of the present invention can be attained, for example, by a method of contact with a solution of hydrogen ions or polyvalent metal cations, or a method of contact with a medium which is coated in advance with hydrogen ions or polyvalent metal cations. The amount of contact or addition is within a range from 0.01 to 100 mol.eq. with respect to the ionic groups of the polymer, preferably 0.05 to 50 mol.eq.

In addition, the ink composition may have a responsiveness to a stimulus. Based on such stimulus-responsiveness, it is possible to increase the viscosity of the ink, by giving a stimulus in the course of an image formation, thereby providing a satisfactory fixing ability. Such stimulus may be suitably selected from a change in temperature, an exposure to an electromagnetic wave, a pH change, and a change in concentration, or may be a combination thereof, in consideration of matching with the image forming process.

A preferred embodiment of the present invention is an ink composition of which characteristics is variable in response to a stimulus, and which can be utilized as a pigment dispersion ink, showing a high dispersion stability of the pigment and capable of improving a bleeding or a feathering phenomenon when applied on a recording medium and further excellent in a fixing ability and a friction resistance. Therefore the ink composition for the pigment dispersion ink of the present invention can be utilized as an image forming material of a high image quality, a low energy consumption and a high recording speed.

The polymer-containing composition of the present invention can be made to change its state (characteristics) in response to various stimuli. Examples of the "stimulus" in the present invention include a change in temperature, an application of an electric field, an exposure to a light (electromagnetic wave) such as ultraviolet, visible or infrared light, a pH change in the composition, an addition of a chemical substance, and a change in the concentration of the composition.

The ink composition of the present invention can be advantageously utilized as an ink for ink jet recording.

In the following, there will be explained a method for preparing an ink jet ink of the present invention.

(Method for Preparing Ink for Ink Jet)

An ink composition of the present invention for ink jet recording can be prepared, for example, by adding a pigment, a block polymer compound of the present invention, an additive etc., into ion-exchanged water, then executing a dispersion by a dispersing equipment, eliminating coarse particles, for example, by a centrifuge, then adding water or a solvent and an additive etc., followed by agitation, mixing and filtration.

The dispersing equipment can be, for example, an ultrasonic homogenizer, a laboratory homogenizer, a colloid mill, a jet mill or a ball mill, which may be utilized singly or in combination.

Also in case of employing a self-dispersible pigment, an ink composition can be prepared in a similar manner as explained in the foregoing.

In the following there will be explained a liquid application method of the present invention.

(Liquid Application Method)

The ink composition of the present invention is employed, in a preferred embodiment, in a liquid application method for ejecting an ink from an ink ejecting unit for application on a recording medium, thereby conducting a recording. It is preferably employed in a pattern forming method for forming a predetermined pattern on a recording medium, or in various image forming methods such as various printing methods, an ink jet method or an electrophotographic method for forming an image or a character on a recording medium, and particularly preferably employed in an ink jet method.

Such ink jet method can be a piezoelectric ink jet method utilizing a piezoelectric element or a thermal ink jet method for effecting recording by a bubble formation under an application of thermal energy. Also such ink jet method can be of the continuous type or on-demand type. Further, the ink composition of the present invention can be utilized in a recording method in which ink is printed on an intermediate transfer member and then transferred onto a final recording medium such as a paper.

In the following, an image forming apparatus of the present invention will be explained.

(Liquid Application Apparatus)

The ink composition of the present invention can be utilized in a liquid application apparatus employing the aforementioned liquid application method, a pattern forming apparatus employing a pattern forming method for forming a predetermined pattern on a recording medium, or an image forming apparatus utilizing various image forming methods such as various printing methods, an ink jet method or an electrophotographic method for forming an image or a character on a recording medium, and particularly employed in an ink jet recording apparatus.

An ink jet recording apparatus utilizing the ink jet ink of the present invention includes a piezo ink jet method employing a piezoelectric element and a thermal ink jet method for effecting recording by a bubble formation under an application of thermal energy.

FIG. 1 is a schematic functional view of an ink jet recording apparatus. A numeral 50 denotes a central processing unit (CPU) of an ink jet recording apparatus 20. A program for controlling the CPU 50 may be stored in a program memory 66, or as so-called firmware in memory means such as an EEPROM (not shown). The ink jet recording apparatus receives recording data from recording data preparation means (such as a computer not shown), into the program memory 66. The recording data may be information of an image or a character to be recorded, information in a compressed form, or encoded information. In case of compressed or encoded information, the CPU 50 is caused to execute an expanding or developing process to obtain the information of the image or the character to be recorded. An X-encoder 62 (for an X-direction or a main scanning direction) and a Y-encoder 64 (for a Y-direction or a sub scanning direction) are provided to inform the CPU 50 with a relative position of a recording head relative to a recording medium.

The CPU 50, based on the information from the program memory 66, the X-encoder 62 and the Y-encoder 64, sends signals for image recording to an X-motor drive circuit 52, a Y-motor drive circuit 54 and a head drive circuit 60. The X-motor drive circuit 52 and the Y-motor drive circuit 54 respectively drive an X-direction drive motor 56 and a Y-direction drive motor 58 thereby moving the recording head 70, relative to the recording medium, to a recording position. When the head 70 is moved to the recording position, the head drive circuit 60 provides the head 70 with signals for causing ejections of the ink compositions (C, M, Y, K) or a stimulus-giving material for causing a stimulus, thereby achieving recording operation. The head 70 may be so constructed as to eject an ink composition of a single color, or plural ink compositions, and may also be provided with a function of ejecting a stimulus providing material for causing a stimulus.

EXAMPLES

In the following the present invention will be further clarified by examples, but the present invention is not limited to such examples.

Example 1

<Synthesis of Block Polymer>

Synthesis of a triblock polymer constituted of isobutyl vinyl ether (IBVE: A block), 2-methoxyethyl vinyl ether (MOVE: B-block) and ethyl 4-(2-vinyloxy)ethoxybenzoate (VEOEtPhCOOEt: C block):

The interior of a glass container equipped with a three-way stopcock was replaced with nitrogen, and adsorbed water was eliminated by heating at 250° C. under a nitrogen flow. After the system was returned to the room temperature, 12 mmol of IBVE, 16 mmol of ethyl acetate, 0.05 mmol of 1-isobutoxyethyl acetate and 11 ml of toluene were added and the reaction system was cooled. When the temperature in the system reached 0° C., polymerization was initiated by adding 0.2 mmol of ethyl aluminum sesquichloride (equimolar mixture of diethyl aluminum chloride and ethyl aluminum dichloride). Completion of polymerization of the A block was confirmed by monitoring the molecular weight at intervals with a gel permeation chromatography (GPC).

Then, polymerization was continued by adding 12 mmol of MOVE constituting the B block. After completion of polymerization of the B block was confirmed by monitoring with GPC, the polymerization was continued by adding a toluene solution of 10 mmol of the C block component. The polymerization reaction was terminated after 20 hours. The termination of the polymerization was achieved by adding a 0.3 mass % ammonia/methanol aqueous solution. The reaction mixture was diluted with dichloromethane, and was washed three times with 0.6 M hydrochloric acid and three times with distilled water. The obtained organic phase was concentrated and dried in an evaporator, then dried under vacuum and was subjected to repeated dialyses with a cellulose semi-permeating membrane and in methanol for eliminating monomer compounds, thereby obtaining a desired triblock polymer. The compound was identified by NMR and GPC, and had Mn=40,482, Mw/Mn=1.36, and a polymerization ratio A:B:C=200:200:30.

The block polymer obtained above was subjected to a hydrolysis in a mixture of dimethylformamide and an aqueous sodium hydroxide solution to obtain a triblock polymer in which the C block was hydrolyzed and converted into a sodium salt. The compound was identified by NMR and GPC.

It was further neutralized in an aqueous dispersion with 0.1 N hydrochloric acid to obtain a triblock polymer in which the C component was converted into a free carboxylic acid. The compound was identified by NMR and GPC.

Example 2

Synthesis of a triblock polymer constituted of isobutyl vinyl ether and $CH_2$=$CHOCH_2CH_2OPhPh$ (IBVE-r-VEEtPhPh: A block), 2-ethoxyethyl vinyl ether (EOVE: B-block) and ethyl 4-(2-vinyloxy)ethoxybenzoate (C block):

The interior of a glass container equipped with a three-way stopcock was replaced with nitrogen, and adsorbed water was eliminated by heating at 250° C. under a nitrogen flow. After the system was returned to the room temperature, 6 mmol of IBVE, 6 mmol of VEEtPhPh, 16 mmol of ethyl acetate, 0.1 mmol of 1-isobutoxyethyl acetate and 11 ml of toluene were added and the reaction system was cooled. When the temperature in the system reached 0° C., polymerization was initiated by adding 0.2 mmol of ethyl aluminum sesquichloride (equimolar mixture of diethyl aluminum chloride and ethyl aluminum dichloride). Completion of polymerization of the A block was confirmed by monitoring the molecular weight at intervals with a gel permeation chromatography (GPC).

Then, polymerization was continued by adding 24 mmol of EOVE constituting the B block. After completion of polymerization of the B block was confirmed by monitoring with GPC, the polymerization was continued by adding a toluene solution of 10 mmol of the C block component. The polymerization reaction was terminated after 20 hours. The termination of the polymerization was achieved by adding a 0.3 mass % ammonia/methanol aqueous solution. The reaction mixture was diluted with dichloromethane, and was washed three times with 0.6 M hydrochloric acid and three times with distilled water. The obtained organic phase was concentrated and dried in an evaporator, then dried under vacuum and was subjected to repeated dialyses with a cellulose semi-permeating membrane and in methanol for eliminating monomer compounds, thereby obtaining a desired triblock polymer. The compound was identified by NMR and GPC, and had Mn=38,300, Mw/Mn=1.34, and a polymerization ratio A:B:C=100:200:30. A polymerization ratio of two monomers in the A block was 1:1.

The block polymer obtained above was subjected to a hydrolysis in a mixture of dimethylformamide and an aqueous sodium hydroxide solution to obtain a triblock polymer in which the C block was hydrolyzed and converted into a sodium salt. The compound was identified by NMR and GPC.

It was further neutralized in an aqueous dispersion with 0.1 N hydrochloric acid to obtain a triblock polymer in which the C component was converted into a free carboxylic acid. The compound was identified by NMR and GPC.

Example 3

Fifteen parts by mass of the block polymer of the carboxylic acid salt type obtained in the example 1, and 7 parts by mass of oil blue-N(C.I. Solvent Blue-14, manufactured by Aldrich Corp.) were co-dissolved in 150 parts by mass of dimethylformamide, and the solution was converted to an aqueous phase by employing 400 parts by mass of distilled water, thereby obtaining an ink composition. It was let to stand at the room temperature for 10 days, but the oil blue did not cause separation nor precipitation.

Example 4

Fifteen parts by mass of the block polymer of the carboxylic acid salt type obtained in the example 2, and 7 parts by mass of oil blue-N(C.I. Solvent Blue-14, manufactured by Aldrich Corp.) were co-dissolved in 150 parts by mass of dimethylformamide, and the solution was converted to an aqueous phase by employing 400 parts by mass of distilled water, thereby obtaining an ink composition. The viscosity was 0.005 Pa·s (5 cps, 20° C.). It was let to stand at the room temperature for 10 days, but the oil blue did not cause separation nor precipitation.

Example 5

The ink prepared in the example 3 was filled in a printing head of an ink jet printer (trade name: BJF800, manufactured by Canon Inc.) and was used in printing operation. One minute after the printing, a printed portion was rubbed strongly three times with a line marker, but no blue trailing could be observed and a very satisfactory fixing ability was confirmed.

Comparative Example 1

An ink composition was prepared by mixing 2 parts by mass of a black self-dispersible pigment (trade name: CAB-0-JET300, manufactured by Cabot Corp.), 0.5 parts by mass of a surfactant (Nonion E-230, manufactured by NOF Corp.), 5 parts by mass of ethylene glycol and 92.5 parts by mass of ion-exchanged water. It had a viscosity of 0.004 Pa·s (4 cps, 20° C.). The ink composition was used in recording operation in the same manner as in the example 5, and 1 minute after recording, a printed portion was strongly rubbed once with a line marker whereby a black trailing was observed.

Example 6

A block polymer having the same A, B and C blocks as in the example 1 and a polymerization ratio A:B:C=100:100:30 was prepared in the same manner as in the example 1. There were obtained Mn=25,300 and Mw/Mn=1.39.

Example 7

The dispersion of micelles including the oil-soluble dye, obtained in the example 3, was brought to a pH value of 3 by addition of 2N hydrochloric acid, whereby the viscosity of the composition increased significantly to 0.230 Pa·s (230 cps). A printing test was executed on an ordinary paper sprayed with hydrochloric acid, and a printed portion was rubbed strongly five times with a line marker, but no blue trailing could be observed and a very satisfactory fixing ability was confirmed.

Example 8

The dispersion of micelles including the oil-soluble dye, obtained in the example 4, was cooled to 5° C., whereby the viscosity of the composition increased significantly to 0.110 Pa·s (110 cps). In the employed triblock polymer, the B segment was a polymer responsive to a temperature stimulus, and was confirmed by DSC to cause a phase transition at about 20° C. in an aqueous solution. Such B segment shows hydrophobicity and hydrophilicity respectively above and below such boundary temperature. Consequently, by cooling the dispersion to below the boundary temperature which is 20° C., the B segment become hydrophilic and spreads, thereby inducing a mutual interaction of the micelles and causing an increase in the viscosity. A printing test was executed on an ordinary paper cooled to 5° C., and a printed portion was rubbed strongly five times with a line marker, but no blue trailing could be observed and a very satisfactory fixing ability was confirmed.

Comparative Example 2

When a dispersion prepared in the comparative example 1 was cooled to 5° C., the viscosity became 0.008 Pa·s (8 cps)

and no increase in the viscosity could be observed. A printing test was executed on an ordinary paper cooled to 5° C. as in the example 8, and a black trailing could be observed as in the comparative example 1.

Example 9

<Synthesis of Block Polymer>

Synthesis of a triblock polymer constituted of isobutyl vinyl ether (IBVE: A block), 2-methoxyethyl vinyl ether (MOVE: B-block) and ethyl 6-(2-vinyloxy)ethoxycaproate (VEEtPenCOOEt: C block):

The interior of a glass container equipped with a three-way stopcock was replaced with nitrogen, and adsorbed water was eliminated by heating at 250° C. under a nitrogen flow. After the system was returned to the room temperature, 10 mmol of IBVE, 16 mmol of ethyl acetate, 0.05 mmol of 1-isobutoxyethyl acetate and 11 ml of toluene were added and the reaction system was cooled. When the temperature in the system reached 0° C., polymerization was initiated by adding 0.2 mmol of ethyl aluminum sesquichloride (equimolar mixture of diethyl aluminum chloride and ethyl aluminum dichloride). Completion of polymerization of the A block was confirmed by monitoring the molecular weight at intervals with a gel permeation chromatography (GPC).

Then, polymerization was continued by adding 10 mmol of MOVE constituting the B block. After completion of polymerization of the B block was confirmed by monitoring with GPC, the polymerization was continued by adding a toluene solution of 10 mmol of the C block component. The polymerization reaction was terminated after 20 hours. The termination of the polymerization was achieved by adding a 0.3 mass % ammonia/methanol aqueous solution. The reaction mixture was diluted with dichloromethane, and was washed three times with 0.6 M hydrochloric acid and three times with distilled water. The obtained organic phase was concentrated and dried in an evaporator, then dried under vacuum and was subjected to repeated dialyses with a cellulose semi-permeating membrane and in methanol for eliminating monomer compounds, thereby obtaining a desired triblock polymer. The compound was identified by NMR and GPC, and had Mn=46,300, Mw/Mn=1.36, and a polymerization ratio A:B:C=200:200:90.

The block polymer obtained above was subjected to a hydrolysis in a mixture of dimethylformamide and an aqueous sodium hydroxide solution to obtain a triblock polymer in which the C block was hydrolyzed and converted into a sodium salt. The compound was identified by NMR and GPC.

It was further neutralized in an aqueous dispersion with 0.1 N hydrochloric acid to obtain a triblock polymer in which the C component was converted into a free carboxylic acid. The compound was identified by NMR and GPC.

Example 10

Synthesis of a triblock polymer constituted of isobutyl vinyl ether and $CH_2=CHOCH_2CH_2OPhPh$ (IBVE-r-VEEtPhPh: A block), 2-methoxyethyl vinyl ether (MOVE: B-block) and ethyl 6-(2-vinyloxy)ethoxycaproate (VEEtPenCOOEt: C block):

The interior of a glass container equipped with a three-way stopcock was replaced with nitrogen, and adsorbed water was eliminated by heating at 250° C. under a nitrogen flow. After the system was returned to the room temperature, 2.5 mmol of IBVE, 2.5 mmol of VEEtPhPh, 16 mmol of ethyl acetate, 0.05 mmol of 1-isobutoxyethyl acetate and 11 ml of toluene were added and the reaction system was cooled. When the temperature in the system reached 0° C., polymerization was initiated by adding 0.2 mmol of ethyl aluminum sesquichloride (equimolar mixture of diethyl aluminum chloride and ethyl aluminum dichloride). Completion of polymerization of the A block was confirmed by monitoring the molecular weight at intervals with a gel permeation chromatography (GPC).

Then, polymerization was continued by adding 10 mmol of MOVE constituting the B block. After completion of polymerization of the B block was confirmed by monitoring with GPC, the polymerization was continued by adding 10 mmol of the C block component. The polymerization reaction was terminated after 24 hours. The termination of the polymerization was achieved by adding a 0.3 mass % ammonia/methanol aqueous solution. The reaction mixture was diluted with dichloromethane, and was washed three times with 0.6 M hydrochloric acid and three times with distilled water. The obtained organic phase was concentrated and dried in an evaporator, then dried under vacuum and was subjected to repeated dialyses with a cellulose semi-permeating membrane and in methanol for eliminating monomer compounds, thereby obtaining a desired triblock polymer. The compound was identified by NMR and GPC, and had Mn=33,600, Mw/Mn=1.38, and a polymerization ratio A:B:C=100:200:80. A polymerization ratio of two monomers in the A block was 1:1.

The block polymer obtained above was subjected to a hydrolysis in a mixture of dimethylformamide and an aqueous sodium hydroxide solution to obtain a triblock polymer in which the C block was hydrolyzed and converted into a sodium salt. The compound was identified by NMR and GPC.

It was further neutralized in an aqueous dispersion with 0.1 N hydrochloric acid to obtain a triblock polymer in which the C component was converted into a free carboxylic acid. The compound was identified by NMR and GPC.

Example 11

Twenty-six parts by mass of the block polymer of the carboxylic acid salt type obtained in the example 9, and 10 parts by mass of an oil-soluble dye Oil Blue-N (trade name: being the same as above, manufactured by Aldrich Corp.) were co-dissolved in dimethylformamide, and the solution was converted to an aqueous phase by employing 400 parts by mass of distilled water, thereby obtaining an ink composition. It was let to stand at the room temperature for 10 days, but the oil blue did not cause separation nor precipitation.

Example 12

Twenty-six parts by mass of the block polymer of the carboxylic acid salt type obtained in the example 10, and 10 parts by mass of an oil-soluble dye Oil Blue-N (trade name: being the same as above, manufactured by Aldrich Corp.) were co-dissolved in dimethylformamide, and the solution was converted to an aqueous phase by employing 400 parts by mass of distilled water, thereby obtaining an ink composition. It was let to stand at the room temperature for 10 days, but the oil blue did not cause separation nor precipitation.

Example 13

The ink prepared in the example 11 was filled in a printing head of an ink jet printer (trade name: BJF800, manufactured by Canon Inc.) and was used in printing operation. One minute after the printing, a printed portion was rubbed strongly three times with a line marker, but no blue trailing could be observed and a very satisfactory fixing ability was confirmed.

Example 14

The dispersion of the example 10 was brought to a pH value of 3 by an addition of 2N hydrochloric acid, whereby the viscosity of the composition increased significantly to 320 cps when observed with DAR100 (manufactured by Rheologica Inc.). Prior to the viscosity increase, the composition had a viscosity below a detection limit, below 10 cps. A printing test in example 13, executed on an ordinary paper sprayed with hydrochloric acid, provided a clear print. A printed portion was rubbed strongly with a line marker, but no blue trailing could be observed, showing a satisfactory fixing ability and a satisfactory water resistance.

Comparative Example 3

An ink composition was prepared by mixing 5 parts by mass of a black self-dispersible pigment (trade name: CAB-O-JET300, manufactured by Cabot Corp.), 0.5 parts by mass of a surfactant (Nonion E-230, manufactured by NOF Corp.), 5 parts by mass of ethylene glycol and 89.5 parts by mass of ion-exchanged water. The ink composition was used in recording operation in the same manner as in the example 13, and 1 minute after recording, a printed portion was strongly rubbed once with a line marker whereby a black trailing was observed.

Example 15

A triblock polymer of the carboxylic acid salt type was synthesized in the same manner as in the example 1, except that the monomer of the A segment in the synthesis of the block polymer of the example 1 was replaced by EOVE. Then, as in the example 3, an ink composition was obtained by dissolving 15 parts by mass of the thus obtained block polymer of the carboxylic acid salt type and 5 parts by mass of Oil Blue-N(C.I. Solvent Blue-14, manufactured by Aldrich Corp.) in 150 parts by mass of dimethylformamide and executing a conversion into an aqueous phase by employing 400 parts by mass of distilled water. The ink composition was let to stand for 10 days at the room temperature, but the Oil Blue did not show separation nor precipitation. The dispersed composition was filled in a printing head of an ink jet printer (trade name: BJF800, manufactured by Canon Inc.) and was used in printing operation as in the example 5. One minute after the printing, a printed portion was rubbed strongly three times with a line marker, but no blue trailing could be observed and a very satisfactory fixing ability was confirmed. Separately, the dispersed composition was brought to 0° C. thereby changing the EOVE polymerized segment, which was hydrophobic, to the hydrophilic type and the polymer was molecularly dissolved in a solvent, whereby the Oil Blue dye was separated from the dispersion. Based on measurement of the absorption spectrum of the filtrate in the visible region and on comparison with the absorption spectrum prior to cooling, it was confirmed that the dye was separated by 99.2% or more. This fact confirmed that the Oil Blue dye was included in the polymer by 99.2% or more.

Example 16

Twenty-three parts by mass of the block polymer of the carboxylic acid salt type obtained in the example 10, and 12 parts by mass of a black pigment (trade name: MOGUL L, manufactured by Cabot Corp.) were dissolved in dimethylformamide, and then 500 parts by mass of distilled water was added to the solution followed by filtration using a 2 μm membrane filter to remove coarse particles, thereby preparing an ink composition. After the ink composition was left to stand for 10 days, no precipitation was observed. The ink composition was filled in a printing head of an ink jet printer (trade name: BJF800, manufactured by Canon Inc.) and was used in printing operation. One minute after the printing, a printed portion was rubbed strongly three times with a line marker, but no black trailing could be observed and a very satisfactory fixing ability was confirmed.

The invention claimed is:

1. A polymer-containing composition comprising a block polymer compound, water or an aqueous solvent, and a functional material, wherein the block polymer compound comprises block segments A, B, and C arranged in succession, the block segment B is a hydrophilic block segment, the block segment C is most hydrophilic while the block segment A is most hydrophobic, the block segment C has an ionic group or an acidic group, and the block segment C is a repeating unit represented by the following general formula (1):

wherein $R^0$ represents —X—(COOH)$_r$ or —X—(COO-M)$_r$;

X represents a linear, branched or cyclic alkylene group with 1 to 20 carbon atoms, —(CH($R^5$)—CH($R^6$)—O)$_p$—(CH$_2$)$_m$—CH$_{3-r}$—, —(CH$_2$)$_m$—(O)$_n$—(CH$_2$)$_q$—CH$_{3-r}$— or a structure in which at least one of methylene groups therein is replaced by a carbonyl group or an aromatic ring structure;

r represents 1 or 2;

p represents an integer from 1 to 18;

m represents an integer from 0 to 35;

n represents 1 or 0;

q represents an integer from 0 to 17;

M represents a monovalent or polyvalent cation; and $R^5$ and $R^6$, which may be the same or different, each independently represent an alkyl group, wherein the block segment B is a repeating unit represented by either one of the following formulae:

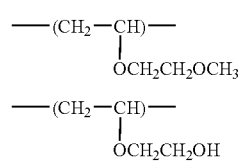

wherein the block segment A is a repeating unit represented by any of the following formulae:

(a)

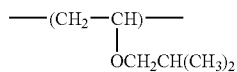

(b)

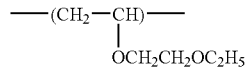

and wherein when the block segment A is the repeating unit represented by formula (b), the block segment B is the repeating unit represented by

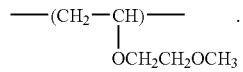

2. The polymer-containing composition according to claim 1, wherein the functional material is included in the block polymer compound.

3. The polymer-containing composition according to claim 1, wherein the functional material is a colorant.

* * * * *